FIG_3

FIG_4

FIG_19

FIG_12

FIG_13

FIG_14

United States Patent Office 3,337,232
Patented Aug. 22, 1967

3,337,232
VEHICLE STEERING SYSTEM
Vasalie L. Peickii, Hillsborough, Dan A. Christensen, Woodside, John H. Bradfute, Santa Clara, and Gustavus A. Bentley, Redwood City, Calif., assignors to Federal-Mogul Corporation, Detroit, Mich., a corporation of Michigan
Filed May 3, 1965, Ser. No. 452,539
21 Claims. (Cl. 280—95)

This invention relates to an improved vehicle steering system.

The invention has particular application to passenger automobiles whether equipped with manual or power steering, and it also applies to trucks, buses, and other wheeled vehicles.

Current steering systems have been subject to several problems which will be briefly discussed under the section headings below. These include the problem of isolating the road noise, shocks, and vibration from the passenger compartment, the problem of obtaining a good steering wheel feel, the problem of obtaining a steering centering force and straight-ahead road feel, and the problems of wear and maintenance. The present invention is intended to solve or ameliorate all these problems.

Isolation of the passenger compartment from road noise and vibration

An automobile's wheels, being in contact with the road, are necessarily subject to shock when they strike bumps, chuckholes and other obstructions. To prevent the shocks from being transmitted to the passenger compartment, most current automotive front suspension systems isolate the upper and lower suspension arms by rubber torsion bushings at the inner ends of the arms. However, there remains a shock-and-noise transmitting path along the steering system, which also connects the wheels to the car body, and the driver can both feel and hear the shock transmitted to the steering system when the car goes over bumps or irregularities in the road.

Some current automobiles make no attempt to isolate the road wheels from the steering wheel and simply transmit the shock, vibration, and road noise to the steering column. In manual systems, this increases driver fatigue and increases the discomfort of the driver; on very bumpy roads steering becomes tiring and sometimes very difficult because of wheel fight. In power steering systems, in such automobiles, the drivers often experience "chuckle," which is a tendency for the steering system to go into a resonant motion of low frequency, apparently due to the inability of a stiff linkage to dampen road vibrations and shocks. This "chuckle" apparently forces a hydraulic power steering system to over-respond, resulting in "hunting" or resonant fluctuations in the system.

In other automobiles, attempts have been made to provide some measure of isolation by means of fabric and elastic couplings in the steering wheel column. Attempts have also been made, sometimes in conjunction with such couplings, to improve that isolation by providing rubber mounting pads or shock dampeners, sometimes known as pucks, between the steering gear box and the frame. These attempts at isolation have significantly increased the cost of the steering system, and the added parts have tended to wear out and to require replacement. Moreover, when pucks have been used in an attempt to isolate the steering gear box from the vehicle frame, the gear box has been forced to shake and vibrate with the wheels, and this shaking and vibration have tended to cause various troubles in the gear box; fretting failures of gear box components have sometimes resulted, and sometimes the gear box housing has been fractured.

The present invention provides a steering system applicable to front suspension systems in which a great degree of effective isolation is obtained at each joint of the steering system, especially those closest to the road wheels, and in which the joints are so inter-connected and so mounted as to act on each other in a novel manner. At least two separate such isolation points are provided between each road wheel and the steering gear box, and these points coact on each other. As a result, there is no need in the steering system for either elastic couplings or gear box isolation from the vehicle frame, so that the parts used for such purposes can be eliminated; yet the isolation is improved. Further, not only is more efficient isolation provided, but the steering gear box can be more firmly attached to the vehicle frame while obtaining isolation between the steering gear box and the road wheel. Hence, with the steering gear box fixed firmly to the vehicle frame and with the frame isolated from the wheels, fretting failures and fracturing of the gear box housing are practically eliminated as sources of trouble.

Steering wheel response

"Response" may be defined here as the closeness with which the front wheels follow the motion of the steering wheel when the driver wishes to turn. To a considerable extent, response tends to be lost when the joints absorb shock and prevent "chuckle." Thus, a stiff joint system has good response but transmits shock and "chuckle," while a soft joint system that absorbs a maximum amount of vibration and shock tends to respond sluggishly and to give the driver a feeling of uncertainty in trying to control the car, especially in sharp cornering, on rough roads, or in high winds, situations where continuous steering effort is required.

Consequently, it is not enough merely to substitute a shock-absorbing type of joint for a stiff one. When shock-absorbing joints are incorporated in the steering system the problem of response is introduced. An object of the present invention is to reconcile response to shock absorption so as to give a positive steering system relatively free from vibration and shock transmission.

Steering wheel feel and centering force (when car is in motion)

Another problem with modern automobile steering systems has been their lack of sufficient steering wheel feel, especially when they are equipped with power steering. This lack has been due partly to the use of large cross-section tires and heavily loaded front wheels but, in any event, all the conventional steering systems now in use in passenger automobiles (as distinct from the combination of the steering system and the suspension system) whether manual or power, have lacked the inherent return to center that most drivers demand from a car in motion.

Because of this demand, center feel has been effected artificially by adjustment of front wheel and front suspension geometry so that the weight of the car can be used to center the wheels, the car being lifted when the wheels are turned away from center. The results have not been the same as inherent return to center of the steering linkage system itself, because these artificial systems placed a load in the steering system that made steering that much more difficult, and because they imposed restrictions on the front suspension system and required the introduction of an undesirable compromise of camber and caster, with attendant expense and complexity. To explain further, centering force in the steering mechanism of present automobiles has been accomplished by inclination of the king pin means and by camber and caster of the wheels, so that as the road wheels were turned, the center of gravity of the front end of the car was raised.

This effort required to lift the center of gravity had to be introduced by the driver in turning the steering wheel. In addition to this effort, he also had to overcome friction within the steering system as well as the friction between the front tires and the ground that results when the wheels are steered. These forces (the force needed to raise the center of gravity, the friction between the tires and ground, and the friction within the rest of the system) defined a load that was imposed on the joints. When loaded, these conventional joints are much harder to turn than are unloaded joints.

By the present invention, centering force and steering wheel feel can be built into the steering system itself, freeing the suspension system from such requirements as caster and camber. The steering system of this invention incorporates joints wherein rubber is elastically deformed during operation; as a result, when the steering wheel is turned, each such joint loads as a rubber spring, and the further the steering wheel is turned, the higher is the load on the rubber spring. A general increase of the steering wheel force follows the increase of the front wheel angle and so provides an excellent steering wheel center feel. Since there is none of the friction of mechanical linkage systems to overcome, the rubber spring force returns the wheels to center when the steering wheel is released, assuming the car to be in motion. As a result, the automobile is steered more easily, not only because of elimination of the friction found in mechanical joints, but also because it becomes possible to eliminate the front end lifting effect and its defects. Therefore, it is unnecessary to tip back the king pins or to tip the road wheel or to raise the center of gravity, and the effort that had to be put into the steering wheel to effect this while fighting the friction at each joint can be eliminated. If the king pins are left inclined, the tire friction with road is the same for both types of systems, but the spring loading in a steering system of this invention does not increase the frictional forces within the system (as did the prior-art systems) because the rotating parts are in essence floating instead of rubbing.

Furthermore, the present invention enables the steering wheel effort to be tailored to approach a feel of the road which is satisfactory to the designer of the vehicle. It becomes feasible to employ a series of individual joints that differ in structure from each other, having different force curves in both the horizontal and vertical planes. When several of these joints are combined, their curves are combined to give a system in which the resultant force varies along a curve that approaches an optimum pattern, instead of remaining at a fixed value as in the prior-art steering systems. The joint forces may be combined in vector-additive fashion; i.e., with the force curves of all the joints in the system adding together as vectors; or they may be combined at least in part in vector-subtractive fashion by preloading one or more joints so that the movement from the neutral or straight-ahead position of such joints causes the stresses on the preloaded joints to lessen in one direction before its neutral position is reached and the stresses begin to rise in the opposite direction. By varying the individual joint curves, an infinite variety of system curves may be devised by vector summation of the individual joint curves. These different effects can be combined to give an optimum design.

In the present invention it is also possible to tailor the system to obtain any of several desired balances between shock absorption and a positive center detent feel, which gives the driver a positive feel of the straight-ahead position. This is especially desirable in cars equipped with power steering, since power steering tends to mask road feel and to leave the driver feeling doubtful of the exact location of the straight-ahead position. By tailoring the system to require a relatively high force for moving the front wheels from the straight-ahead path in either direction, this invention provides this center detent feel. Furthermore, it improves this feel by the spring return toward the center as described above. This action may be adapted to any of the commonly used types of steering systems.

*Elimination of joint wear and maintenance*

Prior-art steering systems employ sliding contact surfaces at each joint where metal slides on metal, or metal slides on plastic, and since they slide they necessarily wear. The same friction requires the driver to put in work that he never recovers from the joints, as he does recover his effort from the joints in this new system. All these systems require periodic maintenance to replace grease and expel foreign material and wear particles. In the steering system of this invention there is an elastic connection of the relatively moving parts at each joint, and there is no sliding and no wear, and foreign materials cause no difficulties. There is neither a possibility nor a desirability of any maintenance at these steering joint parts. Lubrication at these points is never necessary.

Other objects and advantages of the invention will appear from the following description of some preferred embodiments.

*A prior art steering system (FIG. 2)*

Figure 2:
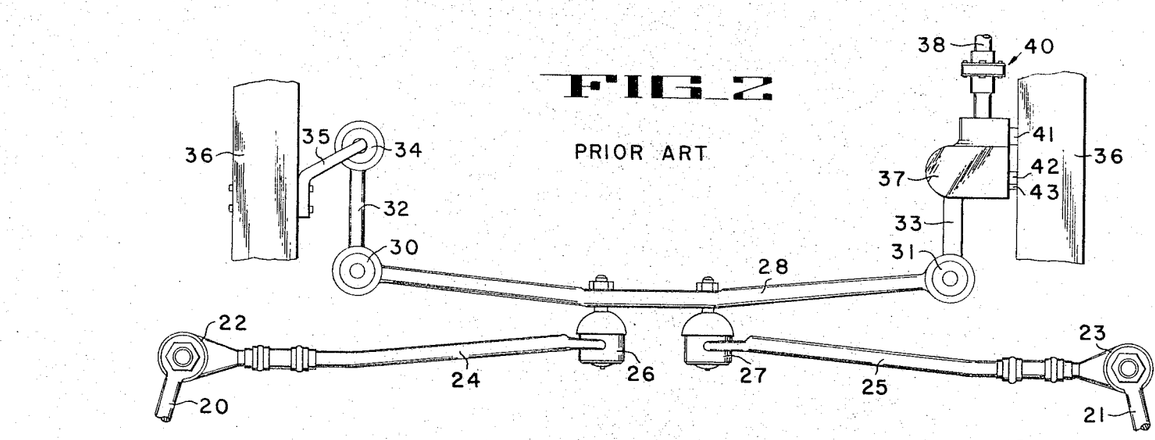
FIG. 2 is a similar view of a prior-art steering system showing the location of certain parts which can be eliminated by the present invention.

In the prior-art steering system shown in FIG. 2, the wheels (not shown in this view) were connected to spindle means with steering arms 20 and 21. The arms 20 and 21 were joined by vertically mounted ball-and-socket steering joints 22 and 23 to connecting rods 24 and 25. Then, horizontally mounted ball-and-socket joints 26 and 27 joined these connecting rods 24 and 25 to an intermediate rod 28. This first portion of the steering system, elements 20 to 28, is one to which this invention is especially directed.

Hinge-type joints 30 and 31 connected the intermediate rod 28 to an idler arm 32 and a pitman arm 33. The idler arm 32 was connected to a hinge-type joint 34, which in turn was connected by a bracket 35 directly to a main vehicle frame 36, while the pitman arm 33 was connected directly to the gears in a steering gear box 37. The gears in the steering gear box 37 were connected to the rotatable steering shaft 38 through a fabric and elastic coupling 40, and the box 37 itself was connected to the frame 36 through three shock dampeners or "pucks" 41, 42, and 43. One purpose of illustrating this prior-art system is to show how this coupling 40 and the pucks 41, 42, and 43, all of which added to the cost and complexity of the system. Also, while isolating the gear box 37 from the frame 36, the pucks 41, 42, and 43 subjected the gear box 37 to the road vibration of the wheels. The destructive tendencies resulting from this structure have been explained before.

The ball-and-socket joints 22, 23, 26 and 27 consumed energy each time they were turned; they were subject to wear, and they required maintenance. They had practically no absorption of shock and vibration, so that the pucks and couplings 40, 41, 42, and 43 had to be used if there was to be any such absorption in the system. Response was good, but there was no center feel in the steering system, requiring that center feel be obtained by altering the design of the front wheel suspension system with attendant increased loads and wear. The joints 22, 23 lay in a different attitude from the joints 26, 27 but no advantage could be taken of this fact because all of them were simply used as ball-and-socket joints in the normal way.

The pitman joint 31 was the most highly loaded joint in the system and it was the only joint common to both road wheels and to the steering wheel force paths. Any wear in the joint 31 was magnified by the short pitman arm 33. Both ball stud joints with metal-to-metal wear surfaces and straight stud joints with plastic-to-metal wear surfaces have been used at this location. Both types transmitted shock and vibration from the road wheels to the steering wheel, and both types wore and required maintenance. The joint 31 took some loading along an axis perpendicular to the plane of rotation.

The lower idler joint 30 was rather short-lived, due to the high frequency along the axis perpendicular to the plane of rotation. Both ball-types and straight-stud-types, and both metal-on-metal and plastic-on-metal structures have been used.

The upper idler joint 34 had the same problems as the lower idler joint, which it often resembled in structure, but in addition there has been a need for resistance to tipping. It needs to rotate freely but to resist tipping, so that ball joints were not usually satisfactory. When it wore, a peculiar problem was created due to the developing looseness. Under certain conditions a vibration would be set up which, though relatively small in actual magnitude (perhaps a ¼″ play) was extremely troublesome and seemed much larger to the driver because it was transmitted to both front wheels causing them to move in toward each other then out away from each other in a regular symmetric manner that gave the driver a good deal of trouble. Thus, wear here resulted not only in acceleration of wear and poor response and unpleasant looseness, but also in a special severe problem.

*One system of the invention (FIG. 1)*

Figure 1:
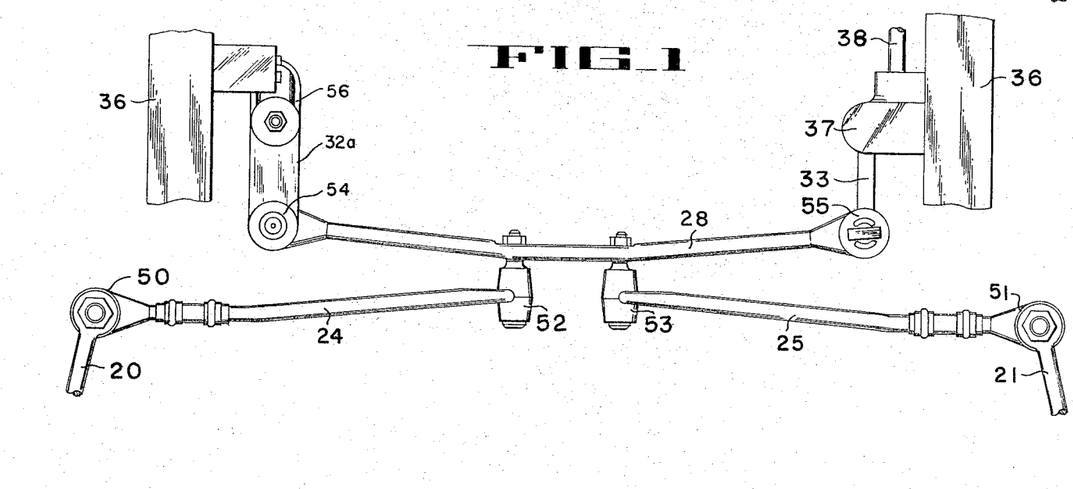
FIG. 1 is a fragmentary top plan view of a major portion of an automotive steering system embodying the principles of the invention.

In the present invention, as shown in FIG. 1, the gear box 37 is connected directly to the frame 36, and the steering shaft 38 is connected directly to the gears in the gear box 37. There are no pucks or elastic couplings, for in our new system elastic flex joints 50, 51, 52, 53, 54, 55 and 56 absorb the shock and vibration.

*The forward sub-system (FIGS. 1 and 3–11)*

Preferably, each of the flex joints 50 and 51 which join the steering arms 20 and 21 to the connecting rods 24 and 25 comprises (as shown illustratively in FIGS. 8 and 9) an outside member 60 and an inside member 65 extending generally vertically and extending centrally through the outside member 60 and spaced therefrom. Elastomer 66 lies between the members 65 and 60 and is bonded to both of them. One of the members 60 or 65 (shown here as the member 60) is secured to or forms part of the connecting rod 24 or 25, and the other member (shown here as the member 65) is secured to the steering arm 20 or 21 which, as said earlier, is a part of the spindle means supporting the road wheel. This structure enables the outer joints 50 and 51 each to impart the movement of the steering wheel S (FIG. 3) through the system with relative rotation of the members 60 and 65 over a limited angle. There is a relative tipping of the members 60 and 65 as the road engaging wheel moves vertically imparting force that acts through the elastomer 66, while shock is absorbed mainly by translation of the inside member 65 relative to the outside member 60, exerting forces through the elastomer 66.

The flex joints 52 and 53 which join the connecting rods 24 and 25 to the intermediate arm 28, preferably comprise (as shown illustratively in FIGS. 10 and 11) an inner member 72 extending generally parallel to the centerline of the vehicle, an outer member 71 surrounding the inner member 72, and elastomer 73 between and bonded to both the inner and outer members 71 and 72. One of the members 71 and 72 (shown here as the outer member 71) is secured to or forms part of the connecting rod 24 or 25, while the other member (shown here as the inner member 72) is secured to the intermediate arm 28. When the steering wheel S is turned, the inner member 72 can tip relatively to the outer member in a generally horizontal plane. Shock absorption is provided mainly by limited translation of the outer member 71 relative to the inner member 72 against the elastomer 73. The connecting rod 24 or 25 is enabled to follow vertical movement of its associated road engaging wheel by limited relative rotation of the inner and outer members 71, 72 transmitted through the elastomer 73.

Thus, the joints 50 and 51 act quite differently from the joints 52 and 53, and both sets of joints act even more differently from the ball-and-socket joints 22, 23, 26 and 27. Far from being merely a substitution of one type of joint for another type, some far-reaching and unexpected results flow from the practice of this invention. Many of the most important results of the present invention flow from the structure, disposition, and relations to each other of the joints 50, 51, 52 and 53, and these results have such merit that even if the joints 30, 31, and 34 are retained, the pucks 41, 42, and 43 and the elastic coupling 40 can all be eliminated; however, the hinge joints 30, 31 and 34 may be replaced by the elastic flex joints 54, 55 and 56.

Figure 3:
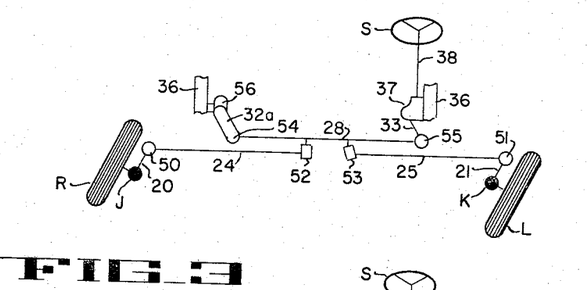
FIG. 3 is a diagrammatic plan view of the steering linkage system of FIG. 1 with the wheels turned to the right, as viewed from the driver's position.
Figure 4:
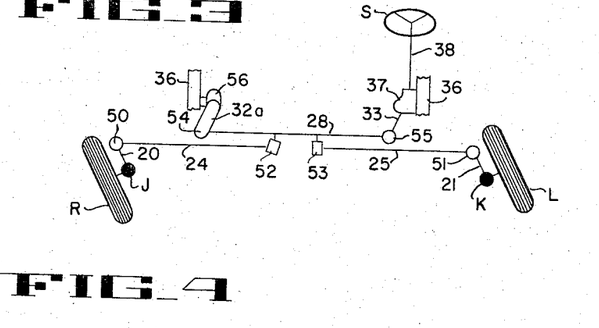
FIG. 4 is a view similar to FIG. 3 with the wheels turned to the left.

FIGS. 3 and 4 show how this system operates on turns, showing the steering wheel S and left and right front wheels L and R with king pin means J and K connecting the wheels to the steering arms 20 and 21.

As already indicated, each of the joints 50, 51, 52, 53 and preferably each of the joints 54, 55 and 56 are made so that the metal portions of the connection are spaced apart and are not in physical contact; the space between them is filled or partially filled with a molded resilient elastomer or rubber-like material that is bonded to the metal portions. The elastic flex joints 50, 51, 52 and 53 may be those described in application Ser. No. 330,518 filed Dec. 9, 1963 by Vasalie L. Peickii et al. or they may be the somewhat modified construction that is shown in FIGS. 8 through 11 already referred to and soon to be described in more detail and which are claimed in other co-pending patent applications, Ser. No. 330,518 filed Dec. 9, 1963, and Ser. No. 401,746 filed Aug. 10, 1964. In any event, an important factor is that in each of these joints the connection is made by elastomer which is loaded and unloaded in various ways during use. Another important factor is that there are at least two of these elastomeric flex joints between the steering wheel S and either front wheel L or R, these two operating in different places.

Figures 7, 10, 11:
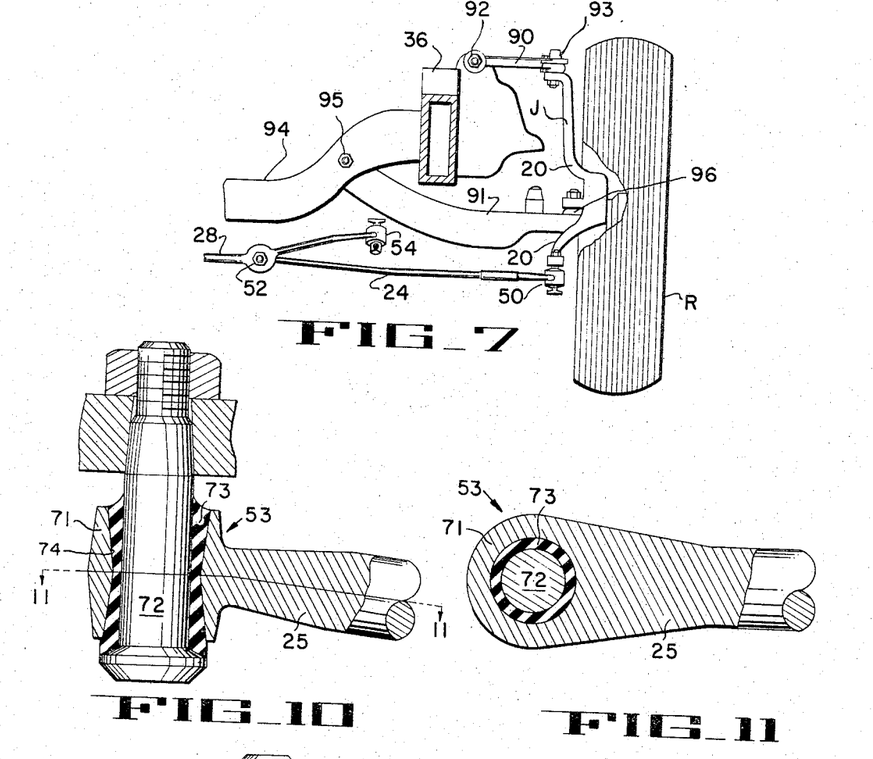
FIG. 7 is a fragmentary view in elevation and partly in section of a vehicle frame, wheel, and steering linkage connection in a system embodying the present invention, looking at the right front wheel from the rear.
FIG. 10 is a view similar to FIG. 8 of another type of steering linkage joint also used in the system of FIG. 1, especially between the connecting rods and the intermediate arm.
FIG. 11 is a view in section taken along the line 11—11 in FIG. 10.

To complete the description of a typical forward subsystem, FIG. 7 shows the right front wheel R of the system of FIGS. 1, 3 and 4 looking from the rear, its upper suspension arm 90, its lower suspension arm 91, and its king pin and steering arm member 20, which also serves as a spindle upon which the wheel R is mounted for rotation. The upper suspension arm 90 is connected to the frame 36 by one or more rubber torsion bushings 92 and is connected to the upper end of the steering arm member 20 by a ball joint 93 whose vertical axis functions as part of the king pin means J. The lower suspension arm 91 is connected to a frame cross member 94 by one or more rubber torsion bushings 95 and is connected to the steering arm member 20 by a ball joint 96 whose vertical axis functions with that of the joint 93 to form the king pin means J of FIGS. 3 and 4. The rubber torsion bushings 92 and 95 are well-known standard equipment which isolate the frame 36 from vibration and road noise transmitted via the suspension arms 90 and 91. Thus, the joints 50, 52 and 54 in this view complete the frame isolation of this side of the car; the other side is quite similar and, as will be seen, the two sides act on each other.

*A preferred outside joint 50 (FIGS. 8 and 9)*

Figure 8:
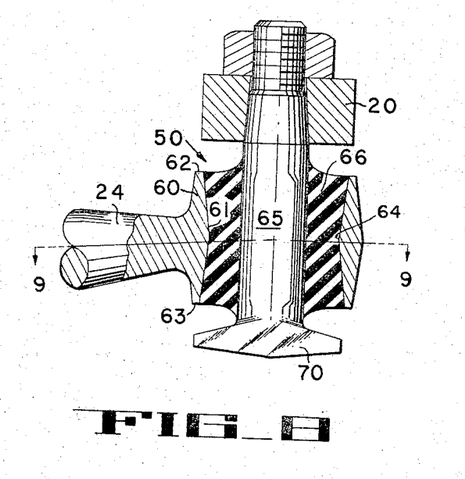
FIG. 8 is a view in elevation and in section of a steering linkage joint of a type that may be used in the present invention, especially near the front road wheels, between the steering arms and the connecting rods.
Figure 9:
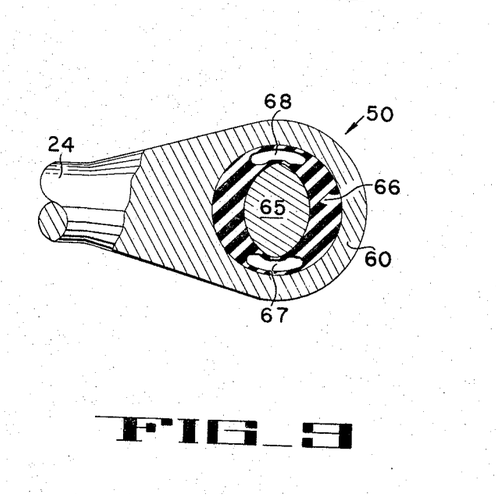
FIG. 9 is a view in section taken along the line 9—9 in FIG. 8.

One type of elastic flex joint 50 which may be used to couple the rods 20 and 24 is shown in FIG. 8. In this joint 50, the ring 60 with walls of substantially rectangular cross-section is secured to the end of the rod 24, or may even be made integral with the rod 24. The inner surface 61 of the ring 60 is preferably tapered as shown and so is narrower at the edges 62, 63 than at the center 64. The center pin or stud 65, as shown in FIG. 9, is preferably of a generally oval cross-sectional shape and lies in the center of the ring 60 where it extends vertically. The elastomer 66, which is bonded to both the ring 60 and the pin 65, substantially fills the space between the ring 60 and the pin 65 except for certain perforations or openings 67 and 68 that are left unfilled in order to provide space in which the elastomer 66 can move when the joint 50 is flexed by turning the rod 24 relative to the steering arm 20; thereby turning is easier than it would otherwise be. The openings 67 and 68 also prevent excessive stressing of the rubber where the stud is closest to the ring, particularly due to rotary motion.

The attitude of the pin or stud 65 to the connecting rod 24 or 25 and the location of the perforations 67 and 68 relative to the stud 65 are of importance, for a change in these things greatly changes the action of the system. Preferably, for most uses, the stud 65 is set so that its major axis lies transverse to the main direction of force, and the perforations 67 and 68 are preferably located at the opposite ends of the major axis of the stud 65, all as shown in FIG. 9. The main direction of the force is typically along or approximately along the axis of the rod 24 or 25 but need not always be so. Thus, the perforations 67 and 68 are generally parallel to the axis of the connecting rod 24 or 25 and on opposite sides of the stud 65. When forces are exerted axially of the connecting rod 24 or 25, as in steering, a solid elastomer would have these portions in shear, and steering would be that much more difficult; at these times (with the structure shown in FIGS. 8 and 9) the elastomer portions in line with the connecting rods 24, 25 are in compression on one side of the stud 65 and in tension on the other side, and these are the main forces then present in the joint 50 or 51. The perforations 67, 68 also reduce the torque when the ring 60 is turned relatively to the stud 65, without materially reducing the overall load-carrying capacity of the joint 50 or 51.

The rod 20 is securely attached to the pin 65 by any desired means. Preferably, the pin 65 has an enlarged head 70 which prevents withdrawal of the pin 65 from the ring 60, so that with its closed ring the joint 50 is fail-safe.

*A preferred inner joint, 52, 53 (FIGS. 10 and 11)*

FIGS. 10 and 11 show another form of joint 53 which is preferred in many circumstances as the inner joint, where operation is different from that of the outer joint. The joint 53 comprises the ring 71 secured to the rod 25, the pin 72, and the elastomer 73 bonded to both the ring 71 and the pin 72. In this instance there are no openings through the elastomer 73, the elastomer 73 being very thin. The joints in the positions of the joints 53 and 54 operate in steering by tipping and undergo only limited rotation, mainly upon vertical wheel movement; hence, the stud or pin 72 is preferably circular, and the functions imparted to the joints 50 and 51 by the openings 67 and 68 are not needed. The joint 53 is therefore somewhat tighter and less flexible and suits the requirements of this position in this system. To better enable tipping, the inner surface 74 of the ring 71 is preferably tapered. Where size is a limiting factor and where the joint 53 must be kept very compact and small in order to avoid interference with other parts, the joint is also especially useful.

Unlike the outer joints 50 and 51, the inner joints 52 and 53 are mounted horizontally rather than vertically, the stud or pin 72 being parallel to the centerline of the vehicle. When the steering wheel S is turned, the effect on the inner joints 52, 53 is a tendency to cause the pin 72 to tip relative to the ring 71, rather than to cause relative rotation as in the outer joints 50, 51. All of the joints 50, 51 and 52, 53 absorb shock by limited relative translation of their ring 60 or 71 and their pin or stud 65 or 72, but whereas the metal members 60, 65 of the outer joints 50, 51 are caused to tip relative to each other when the road engaging wheel moves vertically, the members 71, 72 of the inner joints 52 and 53 are thereby caused to rotate through a small angle.

Thus, the characteristics of the inner joints 52, 53 are different from those of the outer joints 50, 51 both by virtue of their preferred structure and by virtue of the way in which they are disposed in the steering system. This enables the present steering system to achieve a novel cooperation between joints that was absent in the prior-art systems. In addition to the advantages achieved by substituting flex joints for the ball-and-socket joints, novel and important co-actions are obtained that produce unobvious, even unexpected results.

*The system as a tailored combination of joints with differing characteristics (FIGS. 1, 3, and 4)*

By combining into the system joints having different characteristics such as the joints 50 and 53, it becomes possible to reconcile the response of the steering system with isolation of the steering wheel from road shock and "chuckle."

From the foregoing, it will be seen that our new steering system does provide isolation between the frame 36 and steering shaft 38 and the wheels L and R through the series of joints 50, 52, 54, 55 and 56, and the series of joints 51, 53, 54, 55 and 56. By using a series of such joints, isolation can be obtained to such degree that pucks and elastic couplings are unnecessary. It will also be apparent that the gear box 37 is fastened firmly to the frame 36 and that it is free from wheel vibrations, being protected from them through the same joints which are an integral part of the steering system and which provide the improved steering action.

For the purpose of this discussion we define "amplitude dampening" as the reduction in the peak values of the instantaneous force for any shock or vibration input. There is an accompanying lengthening of the time period so that the total energy transmitted remains substantially the same.

For the purposes of analysis—and as a practical system in itself—we may consider the sub-system comprising the steering arms 20, 21, the connecting rods 24, 25, and the intermediate arm 28, with their connecting outer joints 50, 51 and their connecting inner joints 52, 53. Whether the joints of the type shown in FIG. 1 at 30, 31 and 34 are used in the remainder of the system or whether the joints of the type shown in FIG. 2 at 54, 55, 56 and 57 are used, this sub-system is important, with very important co-action between its parts and more and unusual, even unexpected, results from this co-action. So let us consider this sub-system.

In steering, the turning of the steering wheel S acts through the steering gear train and the pitman 33 to move the intermediate arm 28 in an arc in the plane of the pitman 33 and idler arm 32 or 32a while maintaining the intermediate arm 28 parallel to its middle position. This results in moving the pins 72 of each inner joint 52 or 53 parallel to its normal axis to push in one connecting rod 24 or 25 and to pull in the other connecting rod 25 or 24, through the elastomer 73 of each joint 52 or 53. As a result, the outer ends of the connecting rods (i.e., the rings 60) move in arcs about their associated king pin means J and K, thus turning the road-engaging wheels R and L and rotating the studs 65 relative to their rings 60. At the inner joints 52, 53 the rings 71 are tipped relative to their pins 72. In both the inner joints 52, 53 and the outer joints 50, 51, the elastomer 73 or 66 is loaded or unloaded according to the steering position. Now, the linkage assembly 20, 50, 24, 52, 28 and the linkage assembly 21, 51, 25, 53, 28 are in mirror-image relation to each other, and they co-act to build up potential energy during turns which, upon release of the steering wheel, releases kinetic energy for restoring the road-engaging wheels L and R to their straight-ahead position.

In a left turn, the left wheel turns in a shorter radius than does the right wheel; vice versa for a right turn. However, the co-action of the parts means that the forces for the system of FIGS. 1, 3, and 4 are balanced, so that the forces within the system are equal and opposite, and the forces tending to straighten one wheel also generally tend to straighten the other wheel, so that the straightening force of the system acts as a unit on both wheels. This will be discussed further in the succeeding section on steering wheel feel.

Now consider the same sub-system and its response to shock imparted to the front wheel R, as by striking an obstruction that tends to force the wheel R back in the direction from which the vehicle is moving. The stud 65 of the outer joint 50 then tends to be horizontally displaced relative to the ring 60 and this translation causes compression of the elastomer 66 on one side of the stud 65 and tension on the other side of the stud 65, both opposed by the damping action of the elastomer 66. If the motion is not perfectly head-on, there will also be some rotation of the stud 65 relative to the ring 60, also opposed by the elastomer 66 and damped by it. Such force as reaches the ring 60 and is transmitted along the connecting rod 24 tends to cause displacement and tipping of the ring 71 relative to the pin 72 of the inner joint 52, with further damping action. Any force transmitted to the intermediate arm 28 is further damped by the joint 53, and residual forces, if any, are damped by the joint 51. Thus, the two systems cooperate to dissipate and cushion shock into merely a gentle movement and slight heating of the joints (the heating being due to the hysteresis of the rubber therein).

A bump that causes vertical movement of, say the right wheel R, results in vertical translation of the outer joint 50 relative to the inner joint 52, causing tipping in the joint 50 and rotation in the joint 52. The tensile and compressive stresses set up in joint 50 and the shear stresses set up in joint 52 tend to damp the force peaks transmitted to the intermediate arm 28. Any undamped force transmitted to the steering wheel S will have only a fraction of the magnitude of the sharp jolt which would appear in the prior-art system of FIG. 2, where there is practically no damping by the joints 22, 26, 27 and 23 in like circumstances. Further, any component of this force which tends to cause translation of the intermediate arm 28 will be further damped by joints 33 and 51, coupled with the resistance to turning of the wheel L.

For a motion of combined vertical and horizontal (shock) movement, the motions described are combined with results which should now be clear. Again, such results are unobtainable by the system of FIG. 2.

*Steering wheel feel (FIGS. 5 and 6)*

Steering wheel feel is obtained because the joints 50, 51, 52, 53, 54, 55 and 56 have an unstressed position and are stressed when moved to either side of that. This may be in the neutral position, or they may be balanced against each other so that the joints 52 and 53, for example, may be normally in oppositely stressed positions and be loosened by the turn in one direction and tightened in the other direction.

Figure 5:
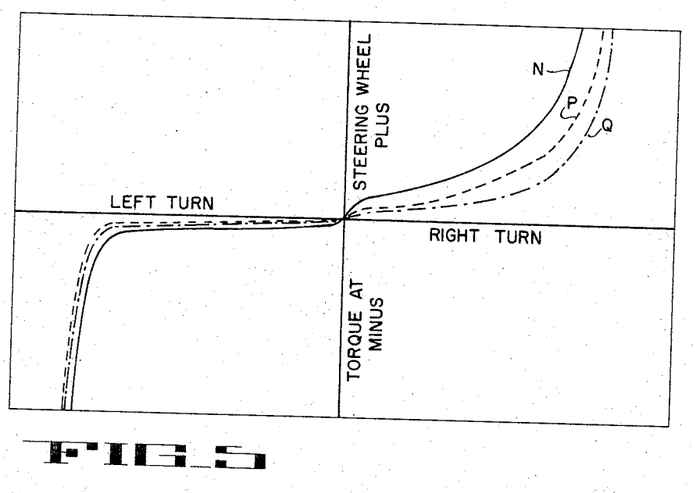
FIG. 5 is a force diagram showing portions of the curves for two individual joints of FIGS. 1, 3, and 4, and how their forces are added into a curve for a subsystem, as part of the production of the curve of FIG. 6.
Figure 6:
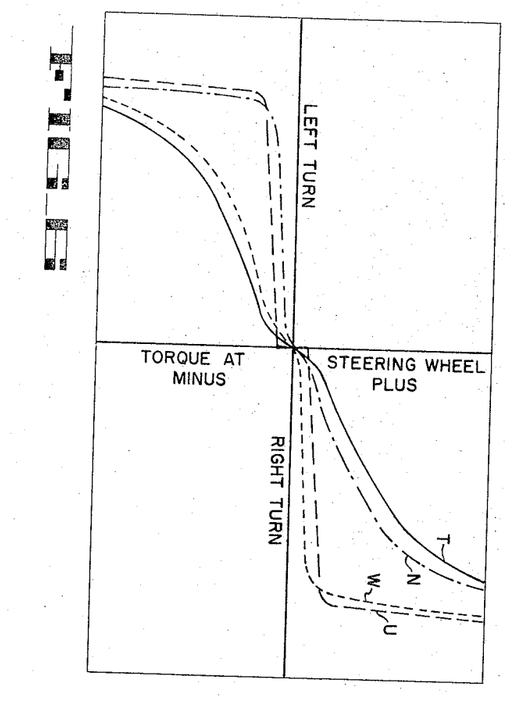
FIG. 6 is a force diagram of a system of the present invention like that shown in FIGS. 1, 3, and 4, showing addition of two sub-system curves and also showing for comparison the curve for a prior-art system of FIG. 2.

The diagrams of FIGS. 5 and 6 illustrate one type of action that can be obtained.

The curve N of FIG. 5 has a peculiar shape resulting from the addition of the curve P to the curve Q. The curve N portrays steering wheel torque increase due to joints 50 and 52 as the road wheels are displaced from the central or straight-ahead position. Curve Q is that portion of the torque contributed by the end joint 50, while curve P is the portion contributed by the intermediate joint 52.

FIG. 6 illustrates how the typical curve N of FIG. 5 is combined with the curve W, which represents a mirror image joint assembly on the opposite side of the vehicle to produce the curve T for the sum of the two sub-systems. Values for a conventional joint system are plotted in curve U which, when compared with curve T, serves to illustrate the change in steering characteristics made possible by the system of this invention.

*Center detent feel (FIGS. 12–16)*

In the system of FIGS. 1, 3, and 4 it was assumed that none of the joints is preloaded. By preloading some or all of the joints changes occur that are reflected in changes from the curve of FIG. 5.

Figure 12:
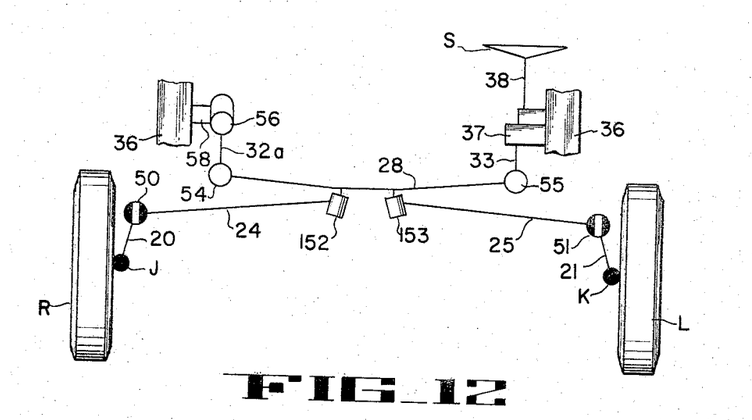
FIG. 12 is a diagram of a modified steering system of the present invention with the inner joints preloaded to give inclination in opposite directions, and giving the response characteristics shown in FIG. 15. The system is shown in the straight-ahead position of the road wheels.
Figure 13:
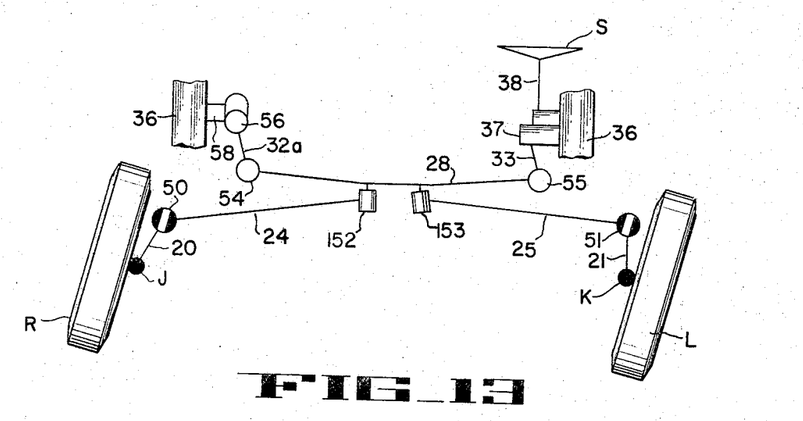
FIG. 13 is a view similar to FIG. 12 with the wheels partly turned to the right.
Figure 14:
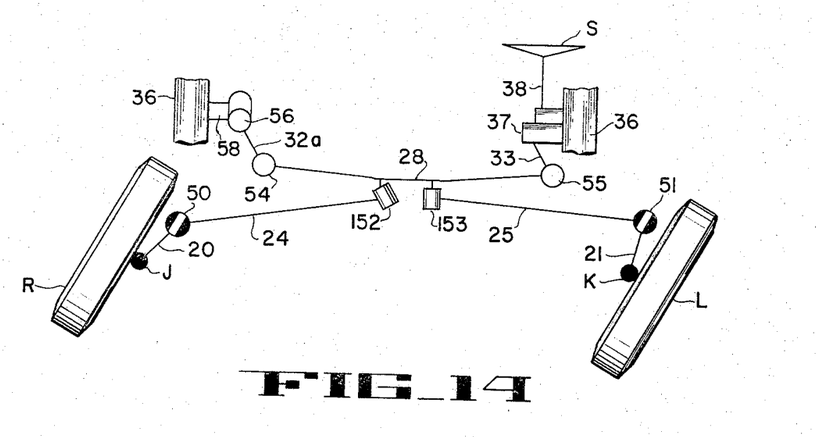
FIG. 14 is a view similar to FIG. 13 with the wheels turned further to the right.

Thus, FIGS. 12–14 show a system in which joints 152 and 153 are used. These joints differ from the joints 52 and 53 only in that they are preloaded, by being tipped, as shown in FIG. 12, in opposite ways in the normal straight-ahead position. Thus, in making a right turn, as shown in FIGS. 13 and 14, the joint 152 reaches its untipped or unloaded position after a short right turn (FIG. 13) and then is loaded and tipped in the opposite direction in reaching the full right turn (FIG. 14). Meanwhile, the joint 153 reaches its fully unloaded and untipped position only as it approaches the full right turn. The action is, of course, vice versa or mirror-image for a left turn.

Figure 15:
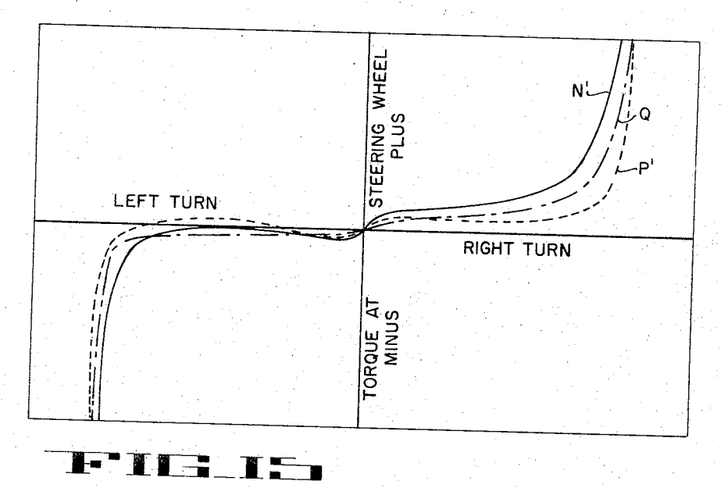
FIG. 15 is a force diagram showing portions of the curves for two individual joints of FIGS. 12–14 and how their forces are added as a part of the production of the curve of FIG. 16.
Figure 16:
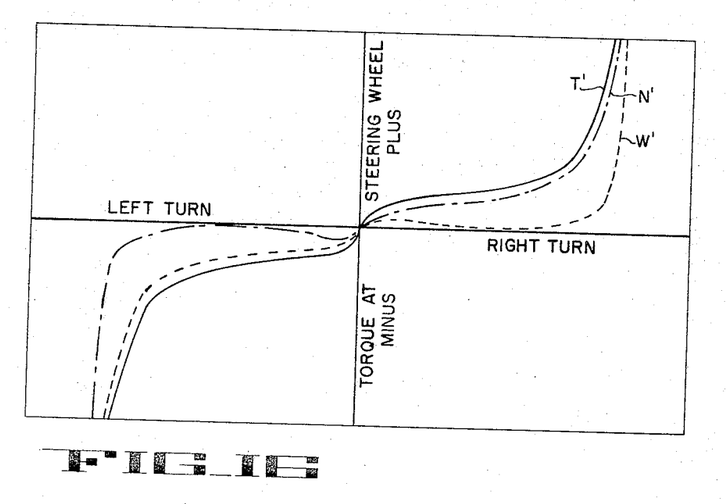
FIG. 16 is a force diagram of a system of the present invention, namely, that of FIGS. 12–14 illustrating how accentuated center detent feel and other characteristics can be obtained.

The result of such tailoring is to give a sharp center-detent feel. FIGS. 15 and 16 are similar to FIGS. 5 and 6. The curve N' of FIG. 15 is obtained by combination of curve Q, the plot of steering wheel rim torque for joint 50 and the plot P' for the joint 152 which is the joint 52 with a preload in the tipping plane. The composite curve N' has a shape which is novel and unexpected in that in a left turn the force reaches a maximum near 45° of steering wheel turn, then decreases to a very low level until it begins to increase, at a rapid rate near the end of steering wheel travel.

In FIG. 16 the curve N' is combined with the curve W', a similar plot of values for the joint system connecting the left road wheel, to result in the composite steering system curve T'.

*The pitman joint 55 and its effect on the system as a whole (FIGS. 17–18)*

The elastic flex joints 54, 55 and 56 have the advantage of providing more places for dampening shock and vibration and more locations where the energy applied by steering effort, manual or power, can be stored during turns and released during the return-to-center of the steering wheel. However, there are other advantages to a system using elastic flex joints in these locations, and they will now be considered.

Since the pitman joint is the most highly loaded joint in the system its tendency to wear in a conventional system is severe, and the use of an elastic flex joint having no wearing parts is significant, especially since the short pitman arm 33 tends to magnify any wear effect.

Figure 19:
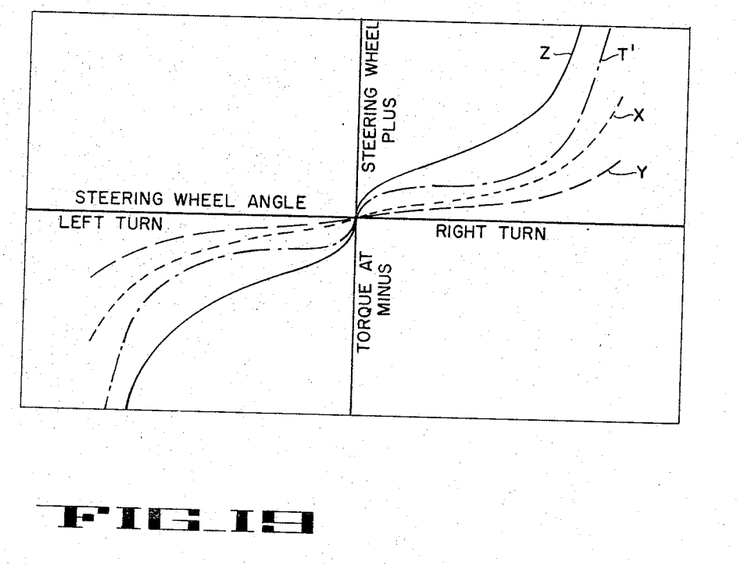
FIG. 19 is a force diagram showing a curve like that of FIG. 16, a curve for a pitman joint like that of FIGS. 17 and 18, a third curve representing the resultants of incorporating idler joints of FIGS. 20 and 21, and a fourth curve representing the resultants of incorporating the pitman joint of FIGS. 17 and 18 and the idler joints of FIGS. 17 and 18 into the system of FIGS. 12–14.

Just as significant is the ability of the pitman joint 55 to further enable tailoring the steering wheel force curve. The pitman joint 55, which is generally perpendicular to the plane of rotation, is the only joint in the steering system common to the force paths between the steering wheel S and both road wheels L and R; and it and the idler joints 54 and 56 are the only joints in the system where the rotation is directly proportional to the steering wheel displacement. Hence, by choosing the slope of the curve, it becomes possible to further tailor the final system curves, as shown in FIG. 19.

Figures 17, 18, 20:
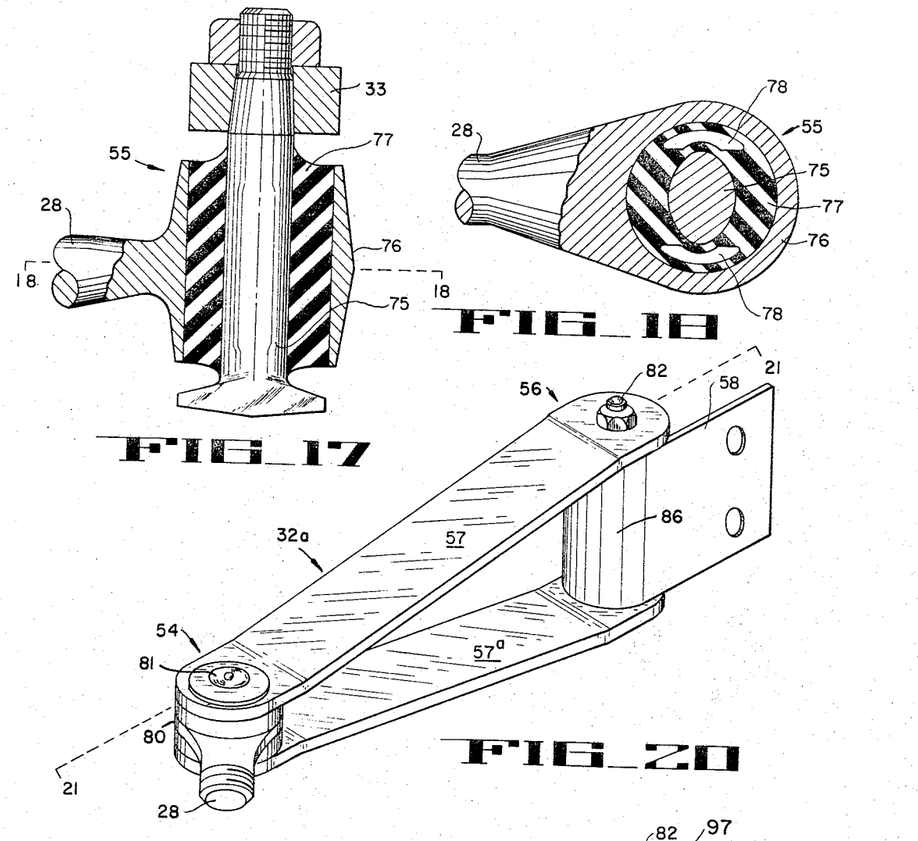
FIG. 17 is a view in elevation and in section of a linkage joint suitable for connecting the intermediate arm and the pitman arm.
FIG. 18 is a view in section taken along the line 18—18 in FIG. 17.
FIG. 20 is a fragmentary view in perspective of a preferred construction of the joints connecting the intermediate arm to the idler arm and the idler arm to the frame.

A preferred pitman joint 55 is shown in FIGS. 17 and 18. A generally ovoidal stud 75 (usually not a true ellipse) is centered in a long generally cylindrical ring 76 and elastomer 77 is bonded to both the ring and the stud. Voids or openings 78 are left at each end of the major axis of the cross-section of the stud 75. The areas of the voids 78 can be less than the areas of the openings 67 and 68 in the joint 50 and 51, at least in proportion to the amount of elastomer, and the joint 55 is preferably larger than the joint 50. The increase in size can be gained principally in vertical length, and since the joint 55 does not tip, the ring 76 can be more nearly cylindrical than the ring 60. The movement is confined to rotation of the stud 75 relative to the ring 76. The size and relative proportion and the elastomer stiffness are the parameters enabling the tailoring referred to above.

*The idler joints 54 and 56 (FIGS. 20 and 21)*

The idler joints 54 and 56, in addition to helping in the damping action, also help to solve the serious wear problem at these locations and eliminate the perculiar vibrations and symmetrical toe-in and toe-out cycle of the wheels L and R caused by wear and design clearance.

Figure 21:
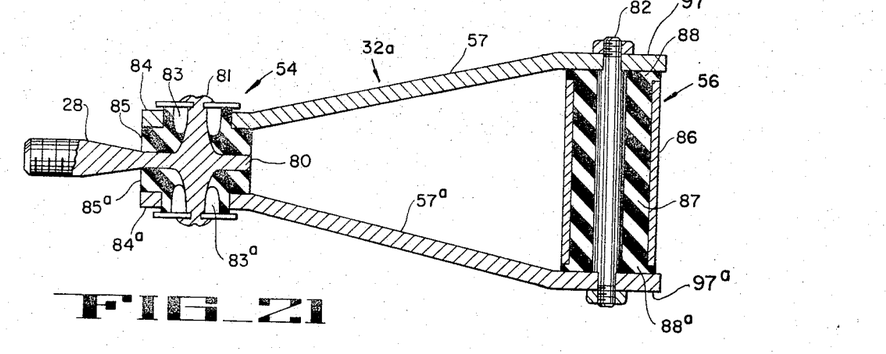
FIG. 21 is a view in section taken through part of FIG. 20 along the line 21—21.

The joints 54 and 56, shown in FIGS. 20 and 21, employ elastomer in compression to resist movement along the stud axis while the elastomer is in shear during stud rotation. For example, the intermediate arm 28 may have relatively thin plate 80 with a centrally located stud 81, while the idler arm 57, 57a may comprise two members connected at each joint 54, 56 by the stud 81 and a stud 82. There are voids 83 and 83a radially between the stud 81 and the ends 84 and 84a of the idler arm 57, 57a, and rubber pads 85 and 85a between the plate 80 and the ends 84 and 84a of the idler arm 57, 57a. The bracket 58 which is secured to the frame 36 may have an enlarged cylindrical ring 86 separated from the stud 82 by elastomer 87, with small elastomer pads 88 and 88a which space the ring 86 from the arms 57 and 57a at each end. This latter structure strongly resists tipping and assures that the rotation will be the only substantial motion in the joint. The upper and lower plates 57 and 57a have portions 97 and 97a at the joint 56, which lie generally parallel to the idler arm plane of rotation. The ring 86, which is the outer member of the joint 56, is generally perpendicular to the portions 97 and 97a and to the pitman plane of rotation (which is substantially the same plane as the plane of rotation of the idler arm 32a). Shocks and vibration are absorbed by both rotation and translation.

Thus, in both the joints 54 and 56, the elastomer pads 85, 85a, and 88, 88a are in compression resisting movement along the axis of the studs 81 and 82, while the elastomer 85, 85a, 87, 88 and 88a is in shear during rotation. It stays tight and properly aligned even though subjected to constant load cycling. In these joints the use of a round stud 81, 82 is usually desirable (and openings or voids may be larger than in joints used at the locations 50 and 51).

FIG. 19 shows how the curve T', when added to curves X and Y representing the pitman and idler joints results in the curve Z which has the shape desired for such a system; a steep slope near the straight-ahead position, a nearly constant force from the steep portion of the curve in the direction of increasing turn, then an increasing spring rate as the road wheels approach full left or right turn.

To those skilled in the art to which this invention relates, many additional changes in construction and widely differing embodiments of the invention will suggest themselves without departing from the spirit and scope of the invention as defined in the claims.

What is claimed is:

1. In an automotive steering system having a vehicle frame, a steering wheel, a steering gear assembly with a gear box connected directly to said frame and holding a gear train connected to said steering wheel, a pitman connected to said steering wheel through said gear train, an intermediate arm connected to said pitman by first joint means and to said frame by second joint means and idler arm means, a pair of spindle means pivotally supported by said frame and each provided with king pin means, and a pair of road-engaging wheels, each supported rotatably by said spindle means, the combination therewith of:

a pair of steering linkage assemblies, each comprising
      a connecting rod extending generally laterally of the vehicle from an inner end near the longitudinal centerline of said vehicle to an outer end adjacent one said spindle means,
      an inner joint connecting the inner end of said connecting rod to said intermediate arm and comprising an inner member extending generally parallel to said centerline of said vehicle, an outer member substantially surrounding said inner member, and first elastomer between and bonded to both said inner and outer members, one of said members being secured to said connecting rod and the other said member being secured to said intermediate arm, said inner joint constituting means for relative tipping of said inner and outer members in a generally horizontal plane when said steering wheel is turned, while also providing means for shock absorption by limited relative translation of said inner and outer members against said elastomer, and also means for enabling said connecting rod to follow vertical movement of its associated said road-engaging wheel by limited relative rotation of the inner and outer members, an outer joint connecting the outer end of said connecting rod to said spindle means and comprising an outside member, an inside member extending generally vertically and extending centrally through said outside member and spaced therefrom, and second elastomer between and bonded to both said inside and outside members, one of said inside and outside members being secured to said connecting rod and the other being secured to said spindle means, said outer joint constituting means to impart the movement of said steering wheel through said system with relative rotation of said inside and outside members over a limited angle and for tipping relatively as the road-engaging wheel moves vertically and for absorbing shock through translation of said inside member relative to said outside member, said pair of steering linkage assemblies being mirror-images of each other, whereby in steering the turning of the steering wheel acts through said steering gear train and pitman to move said intermediate arm in an arc in the plane of said pitman and idler arm means while maintaining said intermediate arm parallel to its middle position, thereby moving one member of each said inner joint parallel to its normal axis to push on one said connecting rod and to pull on the other said connecting rod, through said first elastomer, so that the outer ends of said connecting rods move in arcs about their associated said king pin means, turning said road-engaging wheels and rotating said inside and outside members of said outer joints relative to each other while tipping the members of said inner joint relative to each other, the elastomer in both said joints being loaded and unloaded according to the steering position, the mirror-image structure of the pair of linkage assemblies acting to build up potential energy which upon release of the steering wheel releases kinetic energy for restoring said road-engaging wheels to their straight-ahead position.

2. The steering system of claim 1 wherein said inner joints are preloaded, in mirror-image relationship to each other, whereby when turning the steering wheel in either direction one inner joint at first unloads and then loads in the other direction while the other inner joint is increasing its load consistently in one direction, thereby imparting a center detent feel to said steering system and imparting a variation of turning force with the angle of turn so that after an initial portion of rapidly increasing force necessary to turn the car from a straight-ahead position the force remains substantially constant for continuing turns for a wide angle of turn, increasing again for large angle of turn.

3. The steering system of claim 1 wherein in each said inner and outer joint the two said members are provided with a lost-motion mechanical interlock, so that the joint members do not become disengaged even if the elastomer between them fails or is removed therefrom.

4. The steering system of claim 1 wherein said second elastomer has perforations on opposite sides of said inside member generally parallel to the line of action of the forces extended along said connecting rod, so that when forces are so exterted, as in steering, said perforations occupy the area where otherwise the second elastomer portions would be in shear while the second elastomer portions in line with said line of action and between said inside and outside members are in compression on one side of said inside member and in tension on the other side thereof, said perforations reducing the torque when the inside and outside members are turned relative to each other, without materially reducing the overall load-carrying capacity of said outer joint normal to said inside member.

5. The steering system of claim 1 wherein said first and second joint means are also joints having an outer member and an inner member with elastomer between them bonding them together.

6. The steering system of claim 1 wherein said first joint means comprises an outside member, an inside member extending generally perpendicular to the pitman plane of rotation and extending centrally through said outside member and spaced therefrom, and elastomer between and bonded to both said inside and outside members, one of said inside and outside members being secured to said pitman and the other being secured to said intermediate arm and constituting means for enabling said first joint means to impart the movement of said steering wheel through said system with relative rotation of said inside and outside members over a limited angle and for absorbing shock through translation of said inside member relative to said outside member.

7. The steering system of claim 1 wherein said second joint means and said idler arm comprise first and second idler joints connected by said idler arm, said first idler joint connecting said idler arm to said intermediate arm, said second idler joint connecting said idler arm to said frame, said idler arm having upper and lower plate-like members, said first idler joint comprising a central plate connected to said intermediate arm and located between said idler arm members, and elastomer interposed between said plate and said plate-like members, said second idler joint comprising an outside member, an inside member extending generally perpendicular to the pitman plane of rotation and extending centrally through said outside member and spaced therefrom and secured to said idler arm, and elastomer between and bonded to both said inside and outside members, one of said inside and outsie members being secured to said idler arm and the other being secured to said frame and enabling said second idler joint to respond to the movement of said steering wheel through said system by relative rotation of said inside and outside members over a limited angle and to absorb shock through translation of said inside member relative to said outside member, while said first idler joint responds to the movement of said steering wheel through said system by relative rotation of said central plate and said idler arm members and absorbs shock through their translation.

8. The steering system of claim 7, wherein said first idler joint has a centrally located stud perpendicular to said plate extending through openings in said idler arm members to interlock said plate, stud, and idler arm members in a fail-safe structure.

9. In an automotive steering system, having a vehicle frame, steering control means, a pitman connected to said steering control means, an intermediate arm connected to said pitman, a pair of spindle means pivotally supported by said frame and each provided with king pin means, and a pair of road-engaging wheels, each supported rotatably by said spindle means, the combination therewith:

a pair of steering linkage assemblies, each comprising a connecting rod extending generally laterally of the vehicle from an inner end near the longitudinal centerline of said vehicle to an outer end adjacent one said spindle means, an inner joint connecting the inner end of said conecting rod to said intermediate arm and comprising an inner member extending generally parallel to said centerline of said vehicle, an outer member surrounding said inner member, and first elastomer between and bonded to both said inner and outer members, one of said members being secured to said connecting rod and the other member being secured to said intermediate arm, said joint constituting means for relative tipping of said inner and outer members in a generally horizontal plane when said steering wheel is turned, while also providing means for shock absorption by limited relative translation of said inner and outer members against said elastomer, and also means for enabling said connecting rod to follow vertical movement of its associated said road-engaging wheel by limited relative rotation of the inner and outer members, an outer joint connecting the outer end of said connecting rod to a said spindle means and comprising an outerside member, an inside member extending generally vertically and extending centrally through said outside member and spaced therefrom, and second elastomer between and bonded to both said inside and outside members, one of said inside and outside members being secured to said connecting rod and the other being secured to said spindle means and constituting means for enabling said outer joint to impart the movement of said steering wheel through said system with relative rotation of said inside and outside members over a limited angle and for tipping relatively as the road-engaging wheel moves vertically and for absorbing shock through translation of said inside member relative to said outside member.

10. An automotive steering system of the type having a vehicle frame, a steering wheel, a steering gear assembly with a gear box connected directly to said frame and holding a gear train connected to said steering wheel, a pitman connected to said steering wheel through said gear train, an intermediate arm connected to said pitman by first joint means, idler arm means connected to said frame by second joint means and to said intermediate arm by third joint means, a pair of spindle means pivotally supported by said frame and each provided with king pin means, and a pair of road-engaging wheels, each supported rotatably by said spindle means, a pair of connecting rods each extending generally laterally of the vehicle from an inner end near the longitudinal centerline of said vehicle to an outer end adjacent one said spindle means, a pair of fourth joint means each connecting the inner end of a said connecting rod to said intermediate arm, and a pair of fifth joint means each connecting the outer end of a said connecting rod to a said spindle means, characterized by said fourth joint means each comprising an inner member extending generally parallel to said centerline of said vehicle, an outer member substantially surrounding said inner member, and first elastomer between and bonded to both said inner and outer members, one of said members being secured to said connecting rod and the other said member being secured to said intermediate arm for relative tipping of said inner and outer members in a generally horizontal plane when said steering wheel is turned, while also providing shock absorption by limited relative translation of said inner and outer members against said elastomer, and also enabling said connecting rod to follow vertical movement of its associated said road-engaging wheel by limited relative rotation of the inner and outer members, and by each of said first, second and fifth joint means comprising an outside member, an inside member extending generally normal to the plane of joint rotation and extending centrally through said outside member and spaced therefrom, and second elastomer between and bonded to both said inside and outside members, one of said inside and outside members of each fifth joint means being secured to said connecting rod and the other being secured to said spindle means and enabling said fifth joint means to impart the movement of said steering wheel through said system with relative rotation of said inside and outside members over a limited angle and tipping relatively as the road-engaging wheel moves vertically and absorbing shock through translation of said inside member relative to said outside member, one of said inside and outside members of each first joint means being connected to said pitman and the other being secured to said intermediate arm, for operation generally like that of said fifth joint means, and one of said inside and outside members of each second joint means being connected to said frame and the other being secured to said idler arm means, for operation generally like that of said fifth joint means, said third joint means comprising a central plate and two outer plates parallel to said central plate and elastomer between said central plate and said outer plates and bonded thereto for rotation about an axis normal to said plates, the central plate being secured to one of said intermediate arm and said idler arm and said outer plates being secured to the other.

11. An automotive steering system of the type having a vehicle frame, a steering wheel, a steering gear assembly with a gear box connected directly to said frame and holding a gear train connected to said steering wheel, a pitman connected to said steering wheel through said gear train, an intermediate arm connected to said pitman by first joint means and to said frame by second joint means and idler arm means, a pair of spindle means pivotally supported by said frame and each provided with king pin means, and a pair of road-engaging wheels, each supported rotatably by said spindle means, and a pair of connecting rods each extending generally laterally of the vehicle from an inner end near the longitudinal centerline of said vehicle to an outer end adjacent one said spindle means, a pair of third joint means each connecting the inner end of a said connecting rod to said intermediate arm and a pair of fourth joint means each connecting the outer end of a said connecting rod to a said spindle means, characterized by said first joint means comprising an outside member, an inside member extending generally perpendicular to the plane of pitman rotation and extending centrally through said outside member and spaced therefrom, and elastomer between and bonded to both said inside and outside members, one of said inside and outside members being secured to said pitman and the other being secured to said intermediate arm and constituting means for enabling said first joint means to impart the movement of said steering wheel through said system with relative rotation of said inside and outside members over a limited angle and for absorbing shock through translation of said inside member relative to said outside member, said elastomer having openings therethrough parallel to said inside member and generally in line with said pitman and on opposite sides of the axis of said intermediate arm, enabling better flexing of said first joint means.

12. An automotive steering system of the type having a vehicle frame, a steering wheel, a steering gear assembly with a gear box connected directly to said frame and holding a gear train connected to said steering wheel, a pitman connected to said steering wheel through said gear train, an intermediate arm connected to said pitman by first joint means, idler arm means connected to said frame by second joint means and to said intermediate arm by third joint means, a pair of spindle means pivotally supported by said frame and each provided with king pin means, and a pair of road-engaging wheels, each supported rotatably by said spindle means, a pair of connecting rods each extending generally laterally of the vehicle from an inner end near the longitudinal centerline of said vehicle to an outer end adjacent one said spindle means, a pair of fourth joint means each connecting the inner end of said connecting rod to said intermediate arm, and a pair of fifth joint means each connecting the outer end of said connecting rod to said spindle means, characterized by said second joint means comprising an outside member, an inside member extending generally perpendicular to the plane of rotation of said second joint means and extending centrally through said outside member and spaced therefrom, and an elastomer between and bonded to both said inside and outside members, one of said inside and outside members being secured to said frame and the other being secured to said idler arm and enabling said second joint means to respond to the movement of said steering wheel through said system by relative rotation of said inside and outside members over a limited angle and absorbing shock through translation of said inside member relative to said outside members, said idler means comprising upper and lower members secured to opposite ends of said second joint means and to said inside member.

13. A steering linkage assemby for a vehicle having a frame and road-engaging wheels supported rotatably by spindle means, comprising
   a connecting rod extending generally laterally of the vehicle from an inner end near the longitudinal centerline of said vehicle to an outer end adjacent a steerable wheel thereof,
   a steering control member having an end adjacent the inner end of said connecting rod,
   an inner joint connecting the inner end of said connecting rod to said control member and comprising an inner member extending generally parallel to said centerline of said vehicle, an outer member surrounding said inner member, and first elastomer between and bonded to both said inner and outer members, one of said members being secured to said connecting rod and the other member being secured to said control member and constituting means for relative tipping of said inner and outer members in a generally horizontal plane when said control member is moved, while also providing means for shock absorption by limited relative translation of said inner and outer members against said elastomer, and also means for enabling said connecting rod to follow vertical movement of its associated said road-engaging wheel by limited relative rotation of the inner and outer members,
   an outer joint connecting the outer end of said connecting rod to a said spindle means and comprising an outside member, an inside member extending generally vertically and extending centrally through said outside member and spaced therefrom, and second elastomer between and bonded to both said inside and outside members, one of said inside and outside members being secured to said connecting rod and the other being secured to said spindle means, said outer joint constituting means to impart the movement of said control member through said system with relative rotation of said inside and outside members over a limited angle and means for tipping relatively as the road engaging wheel moves vertically and means for absorbing shock through translation of said inside member relative to said outside member.

14. A steering linkage assembly for a vehicle having a frame and road-engaging wheels supported rotatably by spindle means, and steering means having a steering control member, said assembly having a pair of sub-assemblies, each comprising
   a connecting rod extending generally laterally of the vehicle from an inner end near the longitudinal centerline of said vehicle to an outer end adjacent one said spindle means,
   an inner joint connecting the inner end of said connecting rod to said steering control member and comprising an inner member extending generally parallel to said centerline of said vehicle, an outer member substantially surrounding said inner member, and first elastomer between and bonded to both said inner and outer members, one of said members being secured to said connecting rod and the other said member being secured to said steering control member, said inner joint constituting means for relative tipping of said inner and outer members in a generally horizontal plane when said steering means is used to turn said wheels, while also providing means for shock absorption by limited relative translation of said inner and outer members against said elastomer, and also means for enabling said connecting rod to follow vertical movement of its associated said road-engaging wheel by limited relative rotation of the inner and outer members,
   an outer joint connecting the outer end of said connecting rod to said spindle means and comprising an outside member, an inside member extending generally vertically and extending centrally through said outside member and spaced therefrom, and second elastomer between and bonded to both said inside and outside members, one of said inside and outside members being secured to said connecting rod and the other being secured to said spindle means, said outer joint constituting means to impart the movement of said steering control member through said system with relative rotation of said inside and outside members over a limited angle and means for tipping relatively as the road-engaging wheel moves vertically and means for absorbing shock through translation of said inside member relative to said outside member,
   said pair of steering linkage sub-assemblies being mirror-images of each other,
   whereby in steering said steering means acts through said steering control member to move one member of each said inner joint while in a position parallel to its usual axis to push on one said connecting rod and to pull on the other said connecting rod, each through its said first elastomer, so that the outer ends of said connecting rods move in arcs and turn said road-engaging wheels and rotating said inside and outside members of said outer joints relative to each other while tipping the members of said inner joint relative to each other, the elastomer in both said joints being loaded and unloaded according to the steering position, the mirror-image structure of the pair of linkage sub-assemblies acting to build up potential energy which upon release of the steering means releases kinetic energy for restoring said road-engaging wheels to their straight-ahead position.

15. The steering linkage assembly of claim 14 wherein said inner joints are preloaded, in mirror-image relationship to each other, whereby when the wheels are turned in either direction one inner joint at first unloads and then loads in the other direction while the other inner joint is increasing its load consistently in one direction, thereby imparting a center detent feel to said steering linkage assembly and imparting a variation of force necessary for turning with the angle of turn so that after an initial portion of rapidly increasing force necessary to turn the car from a straight-ahead position, the force remains substantially constant for continuing turns for a wide angle of turn, increasing again for large angle of turn.

16. The steering system of claim 14 wherein said second elastomer is thicker than said first elastomer and has perforations on opposite sides of said inside member generally parallel to the axis of said connecting rod, so that when forces are exerted generally axially of the connecting rod, as in steering, said perforations occupy the area where otherwise the second elastomer portions would be in shear while the second elastomer portions in line with said connecting rod and between said inside and outside members are in compression on one side of said inside member and in tension on the other side thereof, said perforations reducing the torque when the inside and outside members are turned relative to each other, without materially reducing the overall radial load-carrying capacity of said outer joint.

17. In an automotive steering system, having a vehicle frame, a steering wheel, a steering gear assembly with a gear box connected directly to said frame and holding a gear train connected to said steering wheel, a pitman connected to said steering wheel through said gear train, an intermediate arm connected to said pitman by first joint means and to said frame by a pivotally connected idler arm means, and second joint means, a pair of spindle means pivotally supported by said frame and each provided with king pin means, and a pair of road-engaging wheels, each supported rotatably by said spindle means, the combinattion therewith;

a pair of steering linkage assemblies, each comprising
a connecting rod extending generally laterally of the vehicle from an inner end near the longitudinal centerline of said vehicle to an outer end adjacent one said spindle means,
an inner joint connecting the inner end of said connecting rod to said intermediate arm and having an outer sleeve-like first ring connected to said connecting rod, a pin connected to said intermediate arm and extending generally parallel to said centerline of said vehicle and centrally and axially through said ring and spaced therefrom, and first elastomer between and bonded to both said ring and said pin and enabling said pin to tip relatively to said ring in a generally horizontal plane when said steering wheel is turned, while also providing shock absorption by limited translation of said ring parallel to its axis relative to said pin against said elastomer, and also enabling said connecting rod to follow vertical movement of its associated said road-engaging wheel by limited relative rotation of the ring relative to the pin,
an outer joint connecting the outer end of said connecting rod to a said spindle means and having a second outer ring secured to said connecting rod, a central stud secured to said spindle means and extending generally vertically and extending axially and centrally through said second ring and spaced therefrom, and second elastomer between and bonded to both said stud and said second ring and enabling said outer joint to impart the movement of said steering wheel through said system with relative rotation over a limited angle of said second ring relative to said stud and tipping said second ring relaitve to said stud as the road-engaging wheel moves vertically and absorbing shock through translation of said stud parallel to its axis to said second ring,
said second elastomer being thicker than said first elastomer and having perforations on opposite sides of said stud generally parallel to the axis of said connecting rod, so that when forces are exerted axially of the connecting rod, as in steering, said perforations occupy the area where otherwise the second elastomer portions would be in shear while the second elastomer portions in line with said connecting rod and between said stud and said second ring are in compression on one side of said stud and in tension on the other side of said stud, said perforations reducing the torque when the second ring is turned relative to the stud without materially reducing the overall radial load-carrying capacity of said outer joint,
said pair of steering linkage assemblies being mirror-images of each other,
whereby in stearing the turning of the steering wheel acts through said steering gear train and pitman to move said intermediate arm in an arc in the plane of said pitman and idler arm means while maintaining said intermediate arm parallel to its middle position, thereby moving said pins of said inner joints parallel to their normal axis to push on one said connecting rod and to pull on the other said connecting rod, through said first elastomer, so that the outer ends of said connecting rods move in arcs about their associated said king pin means, turning the road-engaging wheels and rotating said studs relative to said second rings while tipping each said first ring relative to its said pin, the elastomer in both said joints being loaded and unloaded according to the steering position, the mirror-image structure of the pair of linkage assemblies acting to build up potential energy which upon release of the steering wheel releases kinetic energy for restoring said road-engaging wheels to their straight-ahead position.

18. The steering system of claim 17 wherein said inner joints are preloaded, in mirror-image relationship to each other, whereby when turning the steering wheel in either direction the load in one inner joint increases, while the other inner joint at first unloads and then reloads in the opposite direction, thereby imparting a center detent feel to said steering system and whereby after an initial sharp increase in the force required for turning from a straight-ahead position, the force required for further turning remains substantially the same until an extreme angle of turn is approached and the force required then increases again sharply.

19. The steering system of claim 17 wherein each said inner and outer joint of the two said members are provided with a lost-motion mechanical interlock, so that the joint members do not become disengaged even if the elastomer between them fails or is removed therefrom.

20. The steering system of claim 17 wherein said outer joint incorporates a round second ring and a stud that is generally oval in cross-section and oriented with respect to said second ring with said perforations lying at the ends of the major axis of the ellipse, so that said perforations lie in what would otherwise be the area of greatest bonded elastomer elongation during relative rotation of said stud and said second ring.

21. The steering system of claim 17 wherein said first and second joint means each comprise an outer ring, a central stud extending generally perpendicular to the plane of rotation of its said joint means and extending axially and centrally through said second ring and spaced therefrom, and second elastomer between and bonded to both said stud and said second ring and enabling said outer joint to impart the movement of said steering wheel through said system with relative rotation over a limited angle of said second ring relative to said stud and absorbing shock through translation of said stud parallel to its axis to said second ring, said elastomer being thicker than said first elastomer and having perforations on opposite sides of said stud generally parallel to the line of action thereupon so that when forces are exerted along said line of action, as in steering, said perforations occupy the area where otherwise the second elastomer portions would be in shear while the second elastomer portions in line with said connecting rod and between said stud and said second ring are in compression on one side of said stud and in tension on the other side of said stud, said perforations reducing the torque when the second ring is turned relative to the stud without materially reducing the overall radial load-carrying capacity of said outer joint.

References Cited

UNITED STATES PATENTS

| | | | |
|---|---|---|---|
| 2,083,609 | 6/1937 | Lefevre | 287—85 X |
| 2,246,833 | 6/1941 | Beemer | 280—95 |
| 2,305,880 | 12/1942 | Leighton | 280—95 X |
| 2,324,984 | 7/1943 | Brown | 287—90 |
| 2,660,905 | 12/1943 | Marquis | 280—95 |
| 2,797,929 | 7/1957 | Herbenar | 280—95 |
| 2,835,521 | 5/1958 | White | 280—95 |
| 2,846,251 | 8/1958 | Herbenar | 287—85 |

FOREIGN PATENTS

| | | |
|---|---|---|
| 1,346,182 | 11/1963 | France. |
| 1,008,129 | 5/1957 | Germany. |
| 811,668 | 5/1959 | Great Britain. |

KENNETH H. BETTS, *Primary Examiner.*